(12) United States Patent
Yuter

(10) Patent No.: US 6,238,090 B1
(45) Date of Patent: May 29, 2001

(54) REUSABLE BAG

(75) Inventor: Jordan J. Yuter, 35 Cherry Ct., Lafayette Hill, PA (US) 19444

(73) Assignee: Jordan J. Yuter, Lafayette Hill, PA (US)

(*) Notice: Subject to any disclaimer, the term of this patent is extended or adjusted under 35 U.S.C. 154(b) by 0 days.

(21) Appl. No.: 09/575,866

(22) Filed: May 17, 2000

(51) Int. Cl.$^7$ ................................................ B65D 33/30
(52) U.S. Cl. ........................ 383/2; 383/91; 383/905
(58) Field of Search .......................... 383/2, 91, 905; 229/101.1

(56) References Cited

U.S. PATENT DOCUMENTS

| | | | | |
|---|---|---|---|---|
| 2,020,804 | * | 11/1935 | Segal | 383/2 |
| 2,356,110 | * | 8/1944 | Waters | 383/91 |
| 2,490,133 | * | 12/1949 | Inman | 229/101.1 |
| 3,539,093 | * | 11/1970 | Massengill | 229/101.1 |
| 3,967,773 | * | 7/1976 | Kaufmann | 229/101.1 |
| 4,761,079 | * | 8/1988 | Wolske | 383/91 |
| 4,898,280 | * | 2/1990 | Runge | 383/91 |
| 4,936,817 | * | 6/1990 | Runge | 383/91 |

\* cited by examiner

*Primary Examiner*—Stephen P. Garbe
(74) *Attorney, Agent, or Firm*—Stuart M. Goldstein

(57) ABSTRACT

An elongated reusable bag is divided into a plurality of segmented sections, separated by perforations through the bag. Pocketed openings or through passages are located adjacent to each perforation. The openings or through passages are formed by separate thin paper or plastic sheets or one elongated thin sheet which overlays the exterior of the bag. A flexible, bendable tab member, used to close the top of the bag when the bag is full, is also conveniently used to close the bag after varying amounts of product are removed. As the bag is emptied, the segmented sections of the bag are torn or cut off and removed at the perforations. After a section is removed, the original tab is inserted in one of the pocketed openings or through passages and used to secure the bag at a point at which the product remains in the bag. As the bag continues to be emptied, the next upper section is removed and the same tab is again inserted within the opening or through passage and the bag is again easily, efficiently, and effectively secured.

9 Claims, 3 Drawing Sheets

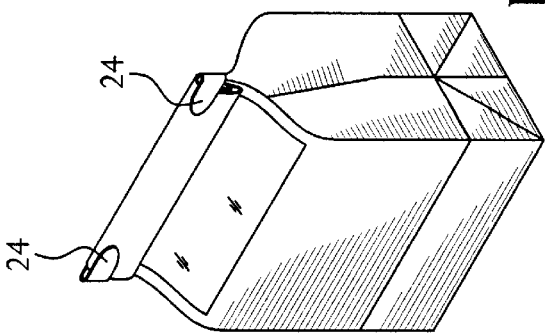
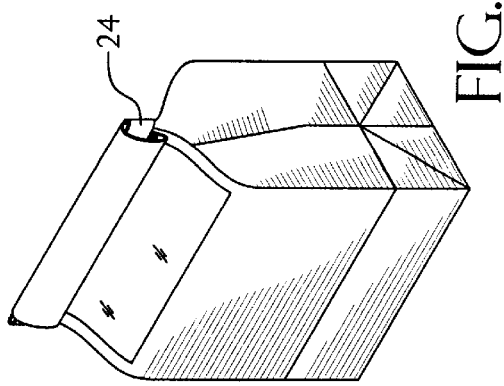
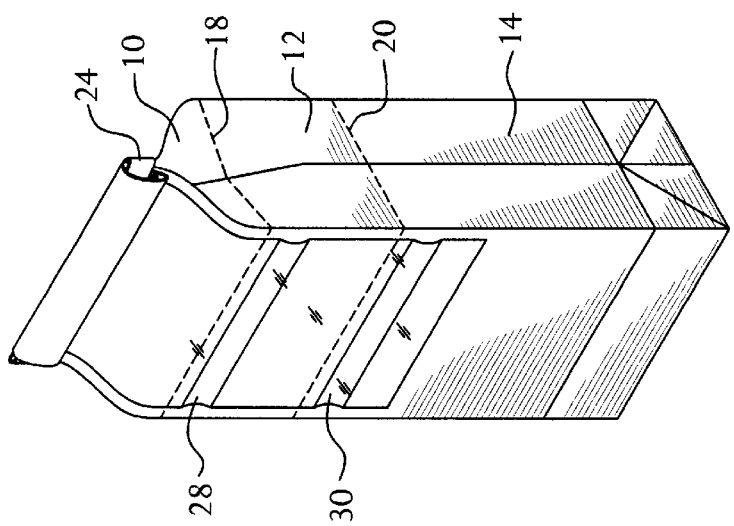
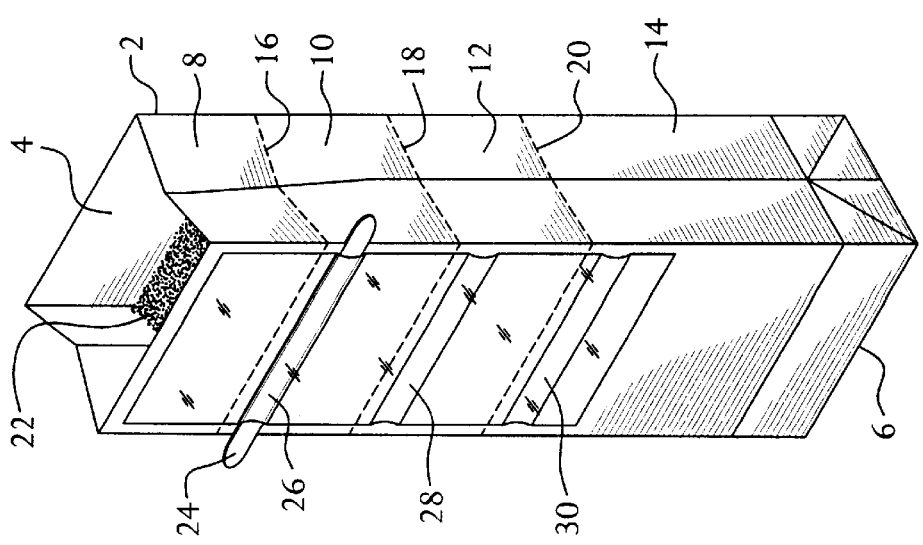

REUSABLE BAG

BACKGROUND OF THE INVENTION

Reusable bags have long been used for the placement of a variety of products which are to be stored and then removed from the bag over a period of time. Such a bag routinely will be opened and closed continuously. In the case of the storage of food in the bag, there is the additional requirement that the remaining food be kept fresh, so the bag must constantly be resealed. Bags of this type are currently used for such diverse products as pet food, cookies, donuts, condiments, and coffee.

These bags are, of course, configured to enclose the full amount of the product which is initially stored. When a bag of this type is fill, it is easily and tightly closed and secured in a closed position by the use of a conventional flexible, bendable tab member. As product is removed from the bag, the upper section of the bag is emptied, while the bag itself usually remains in tact. The remaining product continues to be enclosed in the lower recesses of the bag.

Problems result when a partially emptied bag needs to be closed and resealed. In order to close and secure a bag after it is partially emptied, the vacant section of the bag must either be folded around or rolled up over itself a number of times. As more product is removed, the vacant upper sections of the bag become superfluous and get in the way of effective closure. As the bag continues to be emptied, more of the upper sections are bereft of product and it becomes increasingly difficult to roll or fold these extraneous sections of the bag. At this point, the user may tear the upper sections off, leaving jagged, ripped, uneven edges. Whether the emptied upper bag sections are roller over themselves or ripped off, it is difficult to securely reclose the bag with the flexible tab member. The tab is too small to effectively reseal the bag folded onto itself or ineffective in keeping a torn bag sealed. The bag either will remain partially open and even cause the user to attempt to keep it closed by using staples, clips, or other ineffective make shift closure means.

SUMMARY OF THE INVENTION

It is thus the object of the present invention to overcome the limitations and disadvantages of prior reuseable bags.

It is the object of the present invention to provide a reusable bag which can easily and effectively be closed, secured and resealed as the bag is emptied of its product.

It is another object of the present invention to provide a reusable bag which eliminates the cumbersome inconvenience of closing a less than full bag of product.

It is a further object of the present invention to provide a reusable bag which allows the bag to be closed and resealed in order to maintain freshness of food which may be stored in the bag.

It is an object of the present invention to provide a reusable bag which is divided into a plurality of segmented sections, which sections can easily and individually be removed as the bag is emptied of product.

It is a further object of the present invention to provide a reusable bag with a reusable flexible tab member to easily close the bag, effectively securing the bag not only when it is full, but also when there are varying amounts of product within the bag.

It is another object of the present invention to provide a reusable bag which employs a flexible, bendable tab to close the bag at various segmented sections of the bag.

It is another object of the present invention to provide a reusable bag with a tab which closes the bag effectively and securely in different locations as the bag is emptied of product.

It is still another object of the invention to provide a reusable bag with tab storage means to allow for the insertion of the tab member for purposes of storage and securing the bag at various locations.

The present invention consists of an elongated reusable bag divided into a plurality of segmented sections, separated by perforations through the bag. Pocketed openings or through passages are located adjacent to each perforation. The openings or through passages are formed by separate thin paper or plastic sheets or one elongated thin sheet which overlays the exterior of the bag. A flexible, bendable tab member, used to close the top of the bag when the bag is full, is also conveniently used to close the bag after varying amounts of product are removed. As the bag is emptied, the segmented sections of the bag are torn or cut off and removed at the perforations. After a section is removed, the original tab is inserted in one of the pocketed openings or through passages and used to secure the bag at a point at which the product remains in the bag. As the bag continues to be emptied, the next upper section is removed and the same tab is again inserted within the opening or through passage and the bag is again easily, efficiently and effectively secured.

The novel features which are considered as characteristic of the invention are set forth in particular in the appended claims. The invention itself, however, both as to its design, construction, and use, together with the additional features and advantages thereof, are best understood upon review of the following detailed description with reference to the brief description of the drawings.

BRIEF DESCRIPTION OF THE DRAWINGS

FIG. 1 is a view of the entire reusable bag of the invention, opened, with product stored therein.

FIG. 2 is a view of the reusable bag of the invention, closed and sealed, after the top section has been removed.

FIG. 3 is a view of the reusable bag of the invention closed and sealed, with its top three sections removed.

FIG. 4 is a rear view of the bag shown in FIG. 3.

DETAILED DESCRIPTION OF THE DRAWINGS

Figure 6:
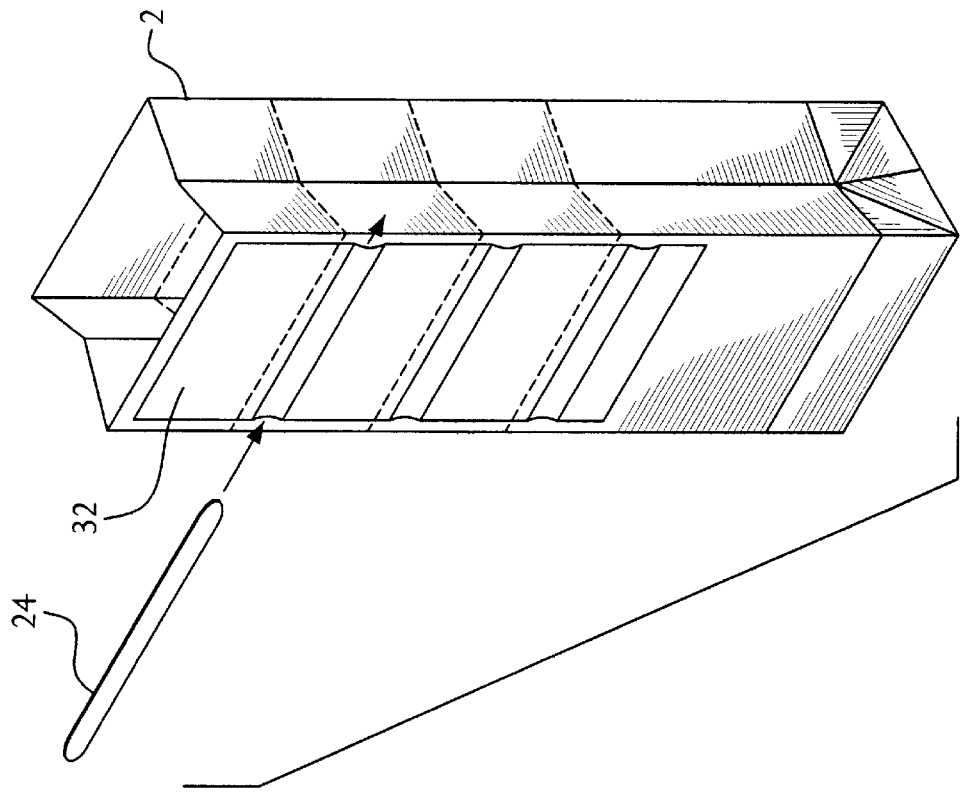
FIG. 6 is a view of the reusable bag of the invention showing the thin overlay sheet of FIG. 5 secured to the bag, forming the pocketed openings or through passages.

Reusable bag 2 of the present invention consists of an open top 4 and a closed bottom 6. Elongated bag 2 comprises segmented sections 8,10,12, and 14 divided by perforations 16,18, and 20. Food or other product 22 is stored within bag 2. Flexible, bendable tab member 24 is used to close and seal bag 2 near its top when it is filled or as substantially filled with product, as is well known in the art. Tab 24 can be inserted into and stored within pocketed opening or through passage 26 when bag 2 is open, as shown in FIG. 1.

As product 22 is removed from bag 2 and section 8 no longer contains any product, section 8 is removed from the bag by tearing it off at perforation 16. Section 10 thus becomes the upper section of bag 8. Tab 24 is inserted into opening 26. Section 10 is folded down and bag 2 is again closed by tab 24, as shown in FIG. 2.

It thus can be appreciated that as additional product 22 is removed from bag 2, section 10 will be removed by tearing at perforation 18; and then as product 22 continues to be emptied from bag 2, ultimately section 12 can be removed by tearing at perforation 20. FIGS. 3 and 4 show the bag secured in its smallest state, with most of product 22 having been removed and tab 24 being located through opening 30 and securing the bag. In this manner, as product 22 is removed from bag 2, the extraneous, superfluous sections ofthe bag which encumber the user who attempts to effectively and efficiently reseal the bag, are removed. This allows bag 2 to be reclosed numerous times in an efficient and effective manner, using the same tab member 24.

Figure 5:
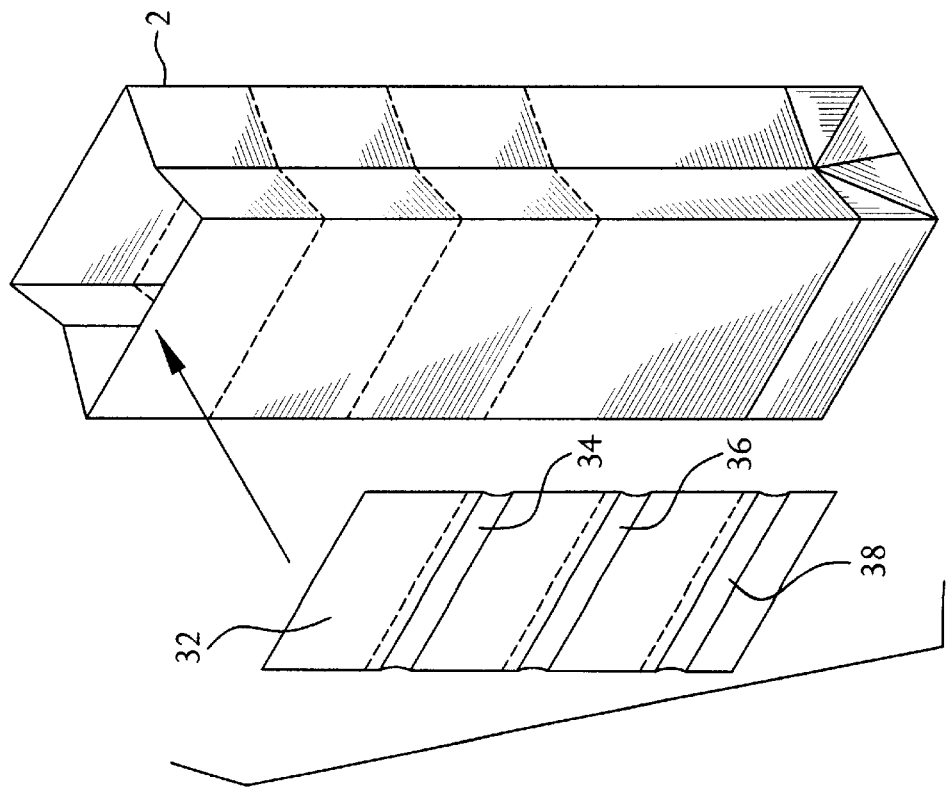
FIG. 5 is a view of the reusable bag of the invention showing the use of a thin overlay sheet to form the pocketed openings or through passages.

FIGS. 5 and 6 disclose the use of a single thin sheet 32, preferable a lightweight paper or plastic product, which is adhered to the outer surface of bag 2. Sheet 32 has ridges 34, 36, 38. Pocketed openings or through passages 26, 28, and 30 on finished bag 2, shown in FIG. 1, are formed between the ridges 34, 36,38 and the outer surface of bag 2.

Figure 8:
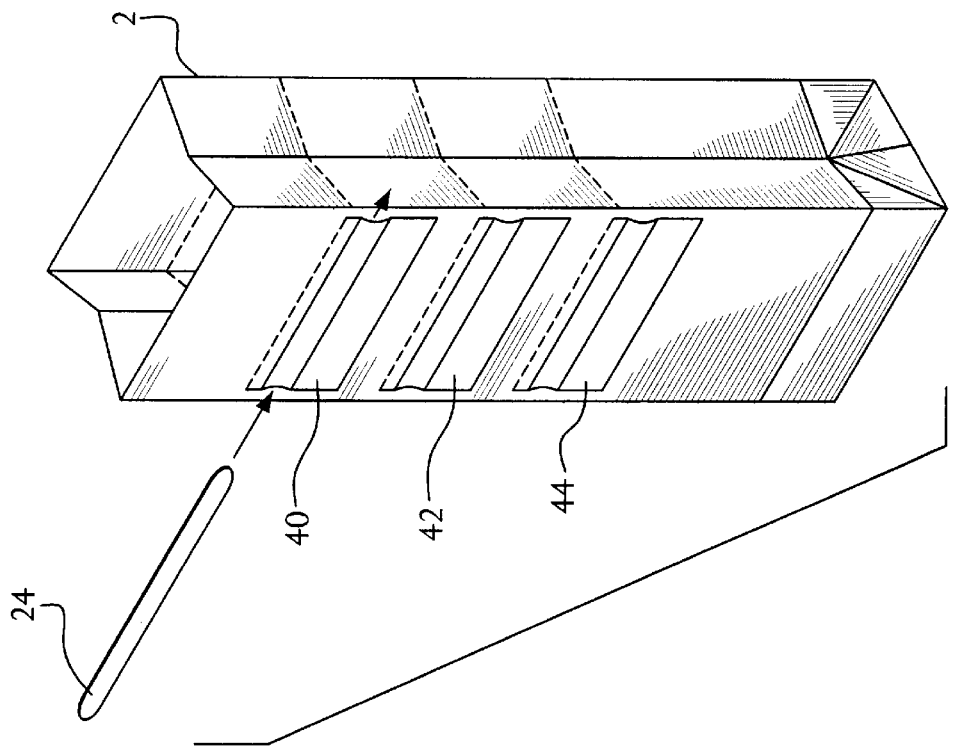
FIG. 8 is a view of the reusable bag of the invention showing the thin overlay sheets of FIG. 7 secured to the bag, forming the pocketed openings or through passages.
Figure 7:
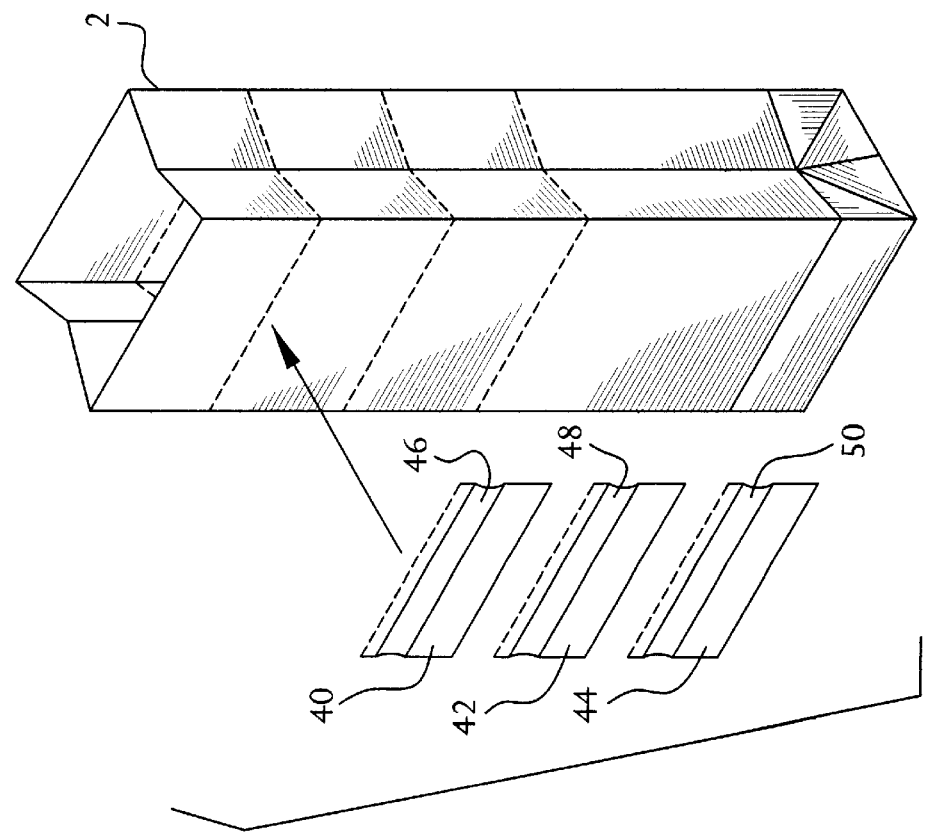
FIG. 7 is a view of the reusable bag of the invention showing an alternate embodiment employing separate thin overlay sheets to form the pocketed openings or through passages.

FIGS. 7 and 8 show an alternate embodiment of the manner of forming the pocketed openings or through passages 26, 28, and 30. Individual thin sheets, 40, 42, and 44, forming ridges 46, 48, and 50 respectively, are each individually adhered to the outer surface of bag 2. Pocketed opening or passage ways 26,28, and 30 are formed between these ridges and the outer surface of bag 2.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without the party from the spirit of the invention.

What is claimed is:

1. A reusable bag comprising:
   a) a foldable enclosure for storing material, said enclosure having a closed bottom and an open top and an elongated body divided into upper segmented sections and lower segmented sections, said sections extending from the open top to the closed bottom;
   b) a plurality of distinct separation means for delineating between the sections of the enclosure and for detachment of the sections, said sections of the enclosure being individually removable at the separation means, whereby when a section is removed, the bottom remains in tact and the elongated body is shortened;
   c) a plurality of pocketed openings, one pocketed opening located at each separation means; and
   d) a single locking means for insertion into each of the pocketed openings and for closing the bag, whereby when an upper section of the enclosure is removed, the locking means is inserted into the uppermost pocketed opening which remains in order to close the bag, the locking means being configured for reuse in each pocketed opening as segments of the enclosure are removed.

2. A reuseable bag in claim 1 wherein the locking means comprises a flexible tab.

3. A reusable bag as in claim 1 wherein one pocketed opening is located adjacent to each separation means.

4. A reusable bag as in claim 1 further comprising overlay sheet means for attachment to the elongated body, whereby the pocketed openings are formed between the exterior of the body and the overlay sheet means.

5. A reusable bag as in claim 4 wherein the overlay sheet means comprises a plurality of separate attachment sheets which form the pocketed openings, one pocketed opening being located adjacent to each separation means.

6. A reusable bag as in claim 4 wherein the overlay sheet means comprises a single attachment sheet forming the pocketed openings, one pocketed opening being located adjacent to each separation means.

7. A reusable bag as in claim 1 wherein the separation means comprises perforations on the elongated body.

8. A reusable bag comprising:
   a) a foldable enclosure for storing material, said enclosure having a closed bottom and an open top and an elongated body divided into segmented sections;
   b) a plurality of distinct separation means for delineating each section of the enclosure and for detachment of the sections, the sections of the enclosure being removable at the separation means, whereby when a section is removed, the bottom remains in tact and the elongated body is shortened;
   c) means to close the bag and for securing the bag at each of the separation means after a section is removed, said means comprising a flexible locking tab and a plurality of pocketed openings, one pocket opening being located at each separation means; and
   d) a single sheet attached to the elongated body, said sheet forming the plurality of pocketed openings between the sheet and exterior of the body.

9. A reusable bag as in claim 8 wherein the separation means comprises perforations on the elongated body.

* * * * *